May 22, 1956     H. H. VICKERS     2,746,086
METHOD OF MANUFACTURING THERMOPLASTIC PELLETS
Filed Sept. 29, 1952
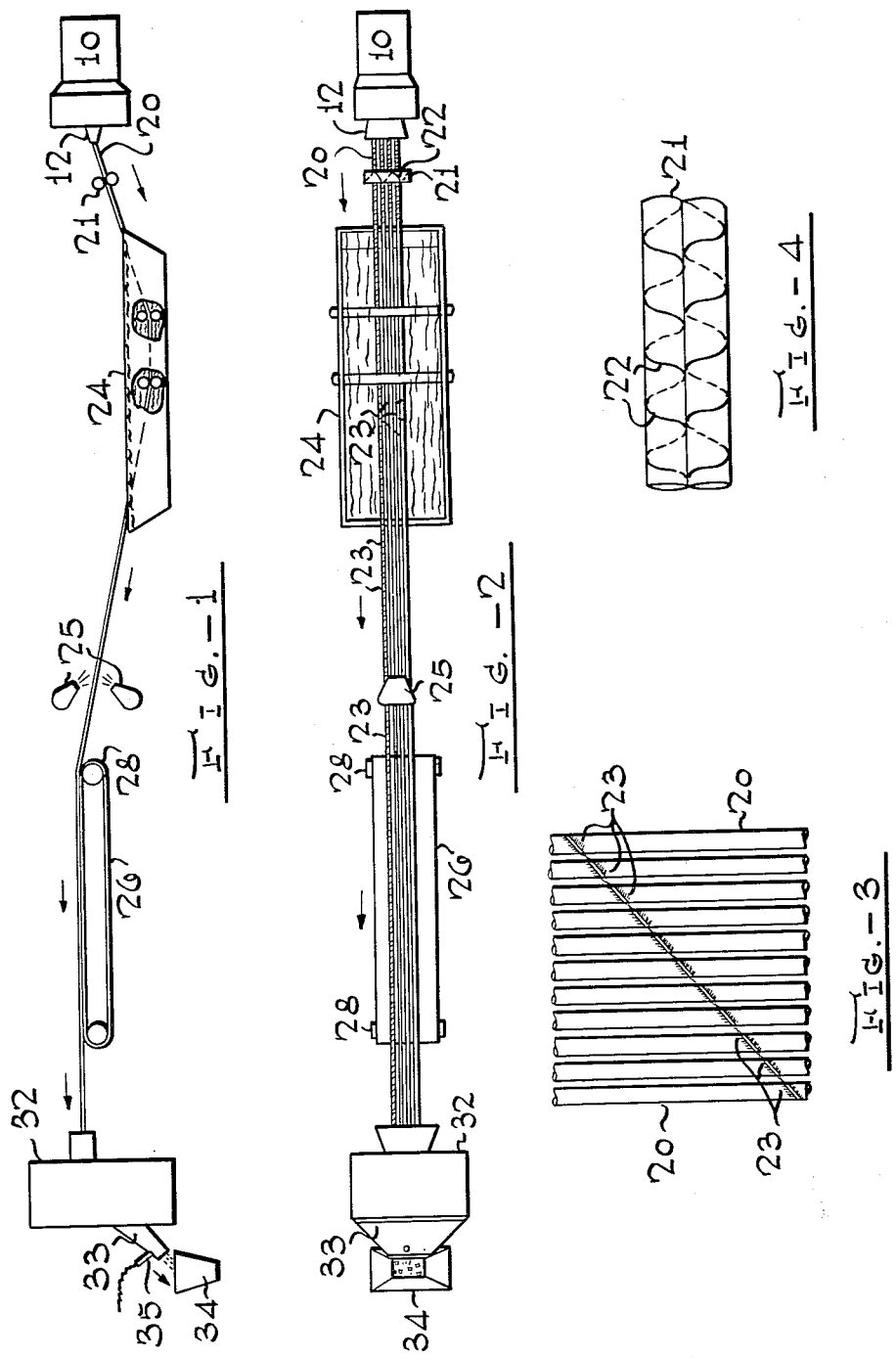
Herbert H. Vickers Inventor
By W. H. Smyers Attorney

United States Patent Office 2,746,086
Patented May 22, 1956

2,746,086

METHOD OF MANUFACTURING THERMO-PLASTIC PELLETS

Herbert H. Vickers, Union, N. J., assignor to Esso Research and Engineering Company, a corporation of Delaware Application September 29, 1952, Serial No. 311,970

6 Claims. (Cl. 18—47.5)

This invention relates to the manufacture of pellets of thermoplastic material and relates more particularly to an improved method for the pelletization of thermoplastic material having low softening points.

Thermoplastic materials have been found to be more marketable and processable if they are manufactured in the form of small cubic pellets approximately 1/8″ in size. These pellets have many advantages over the crumb form of plastic provided in the past. They are more dense and therefore take up less space; they flow more freely; and they do not tend to pick up foreign material or moisture as do the crumbs. When fed to injection molds or extruders, they form a more dense and better finished product than the crumb due to the absence of air pockets in the pellets. In actual tests they have been found to feed three times faster by weight into an extruder than the crumb material would in otherwise equal conditions.

These pellets are manufactured at present by extruding the plastic material in the form of multiple longitudinal rods, cooling the rods, and then chopping them into short cubical pieces. The various manufacturers have found considerable difficulty in this process, in that the material, in order to be satisfactorily extruded, has to be heated to 300° F. or higher. At these temperatures the extruded rods stick together if they happen to touch each other, making separation at the pelletizer difficult. They are also inclined to become an entangled mass and make the pelletizing operations impossible. Other difficulties may be caused by the tendency of the various rods to extrude at different rates and sizes, which again leads to tangling or irregular feeding to the pelletizer.

When the above technique is applied to the pelletization of copolymers of styrene and isobutylene prepared as described and claimed in U. S. Patent 2,274,749, the enumerated difficulties are particularly severe.

It is accordingly the main object of this invention to provide an improved method of producing pellets of thermoplastic material having low softening point.

Another object of the invention is the provision of a method of manufacturing thermoplastic pellets in a continuous process in which a plurality of slender rods of the thermoplastic material is extruded simultaneously in close proximity, yet not touching, then passing the rods through cool pinch rolls one or both of which are embossed with small ribs so that the ribs press upon the rods, flattening them slightly at spaced intervals so that the rods are connected at these flattened points and are thus disposed in side by side relation and fixed or united with each other in said relation by the flattened portions, thus preventing tangling of the extruded rods.

Certain preferred details of construction together with additional objects and advantages will be apparent and the invention itself will be best understood by reference to the following specification and to the accompanying drawings wherein:

Figure 1 is a side view of apparatus embodying the present invention and is illustrative of the method.

Figure 2 is a top plan view thereof.

Figure 3 is a detailed drawing of the pinch rolls showing the ribs embossed thereon.

Figure 4 is an enlarged section of the rods after they have passed the pinch rolls, showing the diagonal webbing.

In accordance with the present invention, there is utilized an extrusion machine 10 in which the plastic is heated and from which the heat-softened plastic is extruded. As supplied to the extrusion machine, the thermoplastic material may be in any suitable form but is preferably granular or in the form of small pieces. The extrusion machine may be of any standard or conventional construction.

In performing the method of the present invention, the extrusion machine 10 is provided with a die plate 12 which in accordance with this invention is provided with a plurality of openings disposed laterally of each other in close relation. The plastic material is extruded in the form of a plurality of slender rods 20 of uniform cross-section all in the same lateral plane. These rods 20 are immediately passed through cooled rollers 21 the surface of one or both rollers being embossed with helical ribs 22. The ribs 22 may be one inch or more apart and may be 1/16 inch deep for 1/8 inch cross-sectional rods. The embossing may be in any other pattern than helical if desired. It may be diamond, circular, rectangular, etc. However, the helical design is particularly effective. When the rods pass through the rolls, they are deformed slightly by the pressure of the ribs. The pressure of the ribs is sufficient to flatten the rods at the point of contact with the ribs causing adjacent rods to adhere at the point of deformation in a web having a diagonal pattern 23. Since the rolls are cooled the rods are also lowered in temperature thus losing their tendency to deform easily thus fixing the rods in side by side relation so that tangling and criss-crossing of the rods is prevented.

The pinch rolls 21 may be cooled by any of a number of ways known to the art. A typical way, particularly applicable to this apparatus, would be to feed the cooling water to the trough over the rolls and catch it in an apron underneath. The cooling water could then be discharged from the apron by gravity directly into the cooling trough 24.

The web 23 which issues from the pinch rolls 21 is further cooled in order to completely harden it. For this purpose cold water is used as the cooling agent. As here shown, web 23 is caused to travel longitudinally through a trough 24 containing the cooling water which flows continuously through the trough.

After the web is cooled and thereby hardened or set, said web is cut successively along transverse lines at the forward end thereof. The cutting operation is performed continually during the travel of the web, and concurrently as the web is formed by the extrusion machine. The cutting operation not only severs an end portion of the web from the body of the web but simultaneously results in the formation of a plurality of individual pellets from said severed end portion. More particularly, during each cutting operation, the thin portions or fins between the flattened rod portions are broken so that said rod portions are separated from each other to form the individual pellets.

The web passes from the trough 24 past air jets 25 whereby excess water is removed and then onto a driven endless belt 26 to and between driven rollers 28 which guide and feed the web continuously to the cutting device at the pelletizer 32. Pellets emerge from the pelletizer 32 through chute 33 and are deposited in container 34. During the operation of cutting the rods into pellets, an electrical charge builds up on the pellets which tends to cause them to stick together or to containers in which they may be stored and to pick up dust from the air. This static charge is effectively eliminated by placing a radiumcontaining bar 35 in the effluent chute 33 from the pelletizer, thus allowing the static charge to leak away and have the pellets neutral.

It will be understood that conveyor belt 26 and cutters in the pelletizer 32 are driven in timed relation to each other and to the operation of the screw of the extrusion machine 10, so that as the gang of rods issues from the extruder it moves at uniform speed in the direction of its length from the extruder to the pelletizer.

As pointed out above the invention is particularly directed to preparing pellets from copolymers of isobutylene and styrene. Such copolymers are prepared by contacting the monomers at temperatures below 0° C. in the presence of an active halide polymerizing catalyst such as boron fluoride or aluminum chloride, with or without substances such as propane, ethylene or chlorinated hydrocarbons as diluents, solvents, or refrigerants. By adjusting the proportions of the two raw materials, copolymers of any desired hardness, melting point or elasticity may be obtained.

The foregoing description does not by any means cover the possible uses of our invention nor the forms which it may assume, but serves to illustrate its fundamental principles and an assembly in which the novel features as disclosed above have been incorporated. It is obvious that changes in the details may be made without departing from either its novel characteristics or the spirit and scope of our invention as defined in the appended claims.

The nature of the present invention having been thus fully set forth and specific examples of the same given, what is claimed as new and useful and desired to be secured by Letters Patent is:

1. The method of manufacturing moldable thermoplastic pellets which comprises forming from a thermoplastic material a plurality of heated separate rods lying close together in substantially the same plane, compressing portions of said rods so that they are adhered at a plurality of spaced points of adhesion throughout their length, cooling the rods thus adhered, moving said rods in the direction of their length and severing successive transverse end portions thereof.

2. The method of manufacturing moldable thermoplastic pellets which comprises forming from a thermoplastic copolymer of isobutylene and styrene, at a temperature of at least about 300° F., a plurality of rods lying close together in substantially the same plane, compressing portions of said rods so that they are adhered at a plurality of spaced points of adhesion throughout their length, cooling the rods thus adhered, moving said rods in the direction of their length and severing successive transverse end portions thereof.

3. The method of manufacturing moldable thermoplastic pellets which comprises forming from a thermoplastic material a plurality of heated separate rods lying close together in substantially the same horizontal plane, flattening portions of the rods at spaced intervals to cause them to adhere to each other at the points of flattening, cooling the rods thus adhered, and severing successive transverse end portions of the rods and breaking the points of adhesion to form a plurality of individual pellets.

4. The method of manufacturing a moldable material into thermoplastic pellets which comprises extruding the material into a plurality of heated separate slender rods in substantially adjacent side by side relation, each of said rods being of substatnially uniform cross section, compressing portions of said rods at spaced intervals by a cooled compression means containing at least one embossed surface whereby the rods are caused to adhere at the points of compression, cooling the rods thus adhered to harden them, successively severing transverse end portions and breaking the points of adhesion of said rods to form individual pellets.

5. The method according to claim 3 in which the thermoplastic material is a copolymer of isobutylene and styrene.

6. The method of manufacturing moldable thermoplastic pellets from a copolymer of isobutylene and styrene which comprises heating the copolymer to at least about 300° F., extruding the copolymer into a plurality of separate rods lying close together in approximately the same lateral plane, joining portions of the rods at spaced points of adhesion by water cooled rollers the surface of at least one of which is embossed with a helical pattern, water-cooling said rods as soon as possible thereafter to harden them, and simultaneously concurrently severing transverse end portions of the rods and separating the rods at their points of adhesion to form individual pellets.

References Cited in the file of this patent

UNITED STATES PATENTS

| | | |
|---|---|---|
| 2,327,460 | Rugeley | Aug. 24, 1943 |
| 2,464,746 | Gering | Mar. 15, 1949 |
| 2,491,525 | Sparks et al. | Dec. 20, 1949 |